US005419418A

United States Patent [19]

Uenohara et al.

[11] Patent Number: 5,419,418

[45] Date of Patent: May 30, 1995

[54] CLUTCH COVER ASSEMBLY

[75] Inventors: Norihisa Uenohara; Hiroshi Mizukami, both of Neyagawa, Japan

[73] Assignee: Kabushiki Kaisha Daikin Seisakusho, Neyagawa, Japan

[21] Appl. No.: 85,649

[22] Filed: Jun. 30, 1993

[30] Foreign Application Priority Data

Jul. 6, 1992 [JP] Japan .............................. 4-046865 U
Jan. 19, 1993 [JP] Japan .................................. 5-006825

[51] Int. Cl.⁶ .............................................. F16D 13/75
[52] U.S. Cl. .............................. 192/70.25; 192/111 A
[58] Field of Search .......................... 192/70.25, 111 A

[56] References Cited

U.S. PATENT DOCUMENTS

| | | | |
|---|---|---|---|
| 4,191,285 | 3/1980 | Thelander, Sr. et al. | 192/111 A |
| 4,207,972 | 6/1980 | Zeidler | 192/111 A |
| 4,228,883 | 10/1980 | Palmer | 192/111 A |
| 4,924,991 | 5/1990 | Takeuchi | 192/111 A |
| 5,186,298 | 2/1993 | Takeuchi | 192/111 A |

FOREIGN PATENT DOCUMENTS

| | | | |
|---|---|---|---|
| 2606477 | 5/1988 | France | 192/111 A |
| 4239289 | 5/1993 | Germany | 192/111 A |
| 4306505 | 9/1993 | Germany | 192/111 A |
| 2176256 | 12/1986 | United Kingdom | 192/111 A |

*Primary Examiner*—Richard M. Lorence
*Attorney, Agent, or Firm*—Knobbe, Martens, Olson & Bear

[57] ABSTRACT

The clutch cover assembly comprises a clutch cover, a pressure plate, a fulcrum ring, a diaphragm spring, and a diaphragm spring posture maintenance mechanism. The maintenance mechanism includes an adjustment mechanism which is composed with a pair of wedge mechanisms inclined surfaces of which extend in the circumferential direction and keep in contact with each other, and a spring for urging one of the wedge mechanisms against the other in the circumferential direction so as to move either one of the wedge mechanisms in the axial direction. Since adjustment mechanism functions by the circumferential wedge mechanisms, it is possible to accurately maintain the diaphragm spring posture without being affected by the engine rotation speed.

14 Claims, 14 Drawing Sheets

CLUTCH COVER ASSEMBLY

BACKGROUND OF THE INVENTION

The present invention relates to a clutch cover assembly, particularly to a clutch cover assembly with a mechanism for keeping a set load constant regardless of wear of the friction members.

The clutch cover assembly is, generally, fixed to a flywheel of the engine and presses friction members of the clutch disc against the flywheel in order to transmit the power of the engine to the speed change gear mechanism. In this kind of the clutch cover assembly and the clutch disc, the wear of the friction members shortens their lives. It is possible to lengthen the life of the clutch disc by increasing effective thickness of facings. For example, the facings are attached to the cushioning plate without using rivets.

When the facings are worn, the posture of the diaphragm spring changes, whereby the set load of the diaphragm spring against the pressure plate decreases. A clutch cover assembly disclosed in Japanese Patent Laying-Open No. 27092/1988 makes the set load of the diaphragm spring return to the initial load automatically in the course of facing wear.

This clutch cover assembly has, as shown in FIG. 17, a pressure plate 1 formed with an annular groove 2 in which a diaphragm spring posture maintenance mechanism 3 is arranged. The mechanism 3 comprises an outer fulcrum ring 5 and an inner fulcrum ring against which outer periphery of the diaphragm spring 4 presses, slide keys 7 and 8 located between the fulcrum rings 5 and 6, and the bottom of the groove 2, respectively. Each of slide keys 7 and 8 is formed with an inclined surface which decreases in axial height proceeding radially outward. The fulcrum rings 5 and 6 are formed with inclined surfaces corresponding to the inclined surfaces of the slide keys 7 and 8. The slide keys 7 and 8 are urged radially outward by respective springs 9 and 10.

As facings 11 of the clutch disc wear, the inner fulcrum ring 6 is moved toward the diaphragm spring 4 by the springs 10 and the slide keys 8 according to the wear amount. At the release operation, the outer fulcrum ring 5 moves according to the amount by which the inner fulcrum ring 6 moved. Consequently, the posture of the diaphragm spring 4 is maintained so that the set load of the diaphragm spring 4 automatically returns to the initial value.

In the above-mentioned structure, when the engine rotation speed rises centrifugal force is applied to the slide keys 7 and 8, which makes the slide keys move radially outward. In this case, even though the facings 11 are not worn, the slide keys 7 and 8 move so as to move the fulcrum rings 5 and 6 axially. As a result, it is Impossible to make the wear amount of the facings 11 correspond to the moving amount of the fulcrum rings 5 and 6 correctly and to maintain the initial set load of the diaphragm spring 4.

SUMMARY OF THE INVENTION

It is an object of the present invention to maintain the initial set load of the diaphragm spring irrespective of increase in engine rotation speed.

A clutch cover assembly according to an aspect of the present invention presses friction members connected to an output member against an input rotation member, and also releases the pressure. The clutch cover assembly comprises a clutch cover, an annular pressure plate, a projection, a diaphragm spring and a diaphragm spring posture maintenance mechanism. The clutch cover is fixed to the input rotation member. The pressure plate is located within the clutch cover and is provided with a pressing surface on one lateral surface for pressing the friction members. The projection is located opposite of the pressing surface of the pressure plate. The diaphragm spring has a portion supported by the clutch cover and a portion for pressing the projection so as to press the pressure plate toward the input rotation member. The diaphragm spring posture maintenance mechanism is for keeping axial distance constant between the projection and the diaphragm spring portion supported by the clutch cover. The mechanism includes an adjustment mechanism composed of a pair of wedge mechanisms and an urging member. Each of wedge mechanisms has an inclined surface stretching in the circumferential direction and keeping contact with each other. The urging member urges one of the wedge mechanisms to the other in the circumferential direction so as to move one of the wedge mechanisms in the axial direction.

When the friction members are worn, the diaphragm spring posture maintenance mechanism maintains the axial distance constant between the projection and the diaphragm spring portion supported by the clutch cover by moving either projection or the diaphragm spring supported portion. Consequently, the initial set load of the diaphragm spring can be maintained.

Furthermore, since the adjustment mechanism of the diaphragm spring posture maintenance mechanism includes wedge mechanisms functioning in the circumferential direction, the mechanism is not affected by the rotation speed of the input rotation member. Consequently, it is possible to maintain the diaphragm spring posture accurately according to the wear amount of friction member.

In a clutch cover assembly according to another aspect of the present invention, the adjustment mechanism urges the projection in order to move the projection toward the diaphragm spring. The diaphragm spring posture maintenance mechanism further includes a regulation mechanism which prohibits the projection movement and allows the adjustment mechanism movement according to the wear amount of the friction members.

The release operation releases the urging force of the diaphragm spring against the projection. If the friction members are worn at the last set operation, the projection is urged by the adjustment mechanism toward the diaphragm spring and is allowed to move by the amount corresponding to the wear amount of the friction members. Accordingly, the initial set load is obtained at the next set because the diaphragm spring posture has returned to the original posture.

In a clutch cover assembly according to other aspect of the present invention, the diaphragm spring posture maintenance mechanism further includes a regulating mechanism which allows the diaphragm spring portion supported by the clutch cover to move toward the friction members according to the wear amount of the friction members. One of the pair of wedge mechanisms moves in order to fill a space between the clutch cover and the diaphragm spring portion supported by the clutch cover, the space being formed by the diaphragm spring portion movement.

If the clutch is released after the friction member is worn, the diaphragm spring supported portion supported is moved by the regulating mechanism according to the wear amount of the friction members. The space between the clutch cover and the diaphragm spring portion is filled by one of the wedge mechanisms. Consequently, the initial set load is obtained at the next set operation because the diaphragm spring has obtained the original pressing posture.

The foregoing and other objects and advantages of the present invention will become more apparent from the following detailed description, with reference to the accompanying drawings.

DESCRIPTION OF THE PREFERRED EMBODIMENTS

First Embodiment

Figure 1:
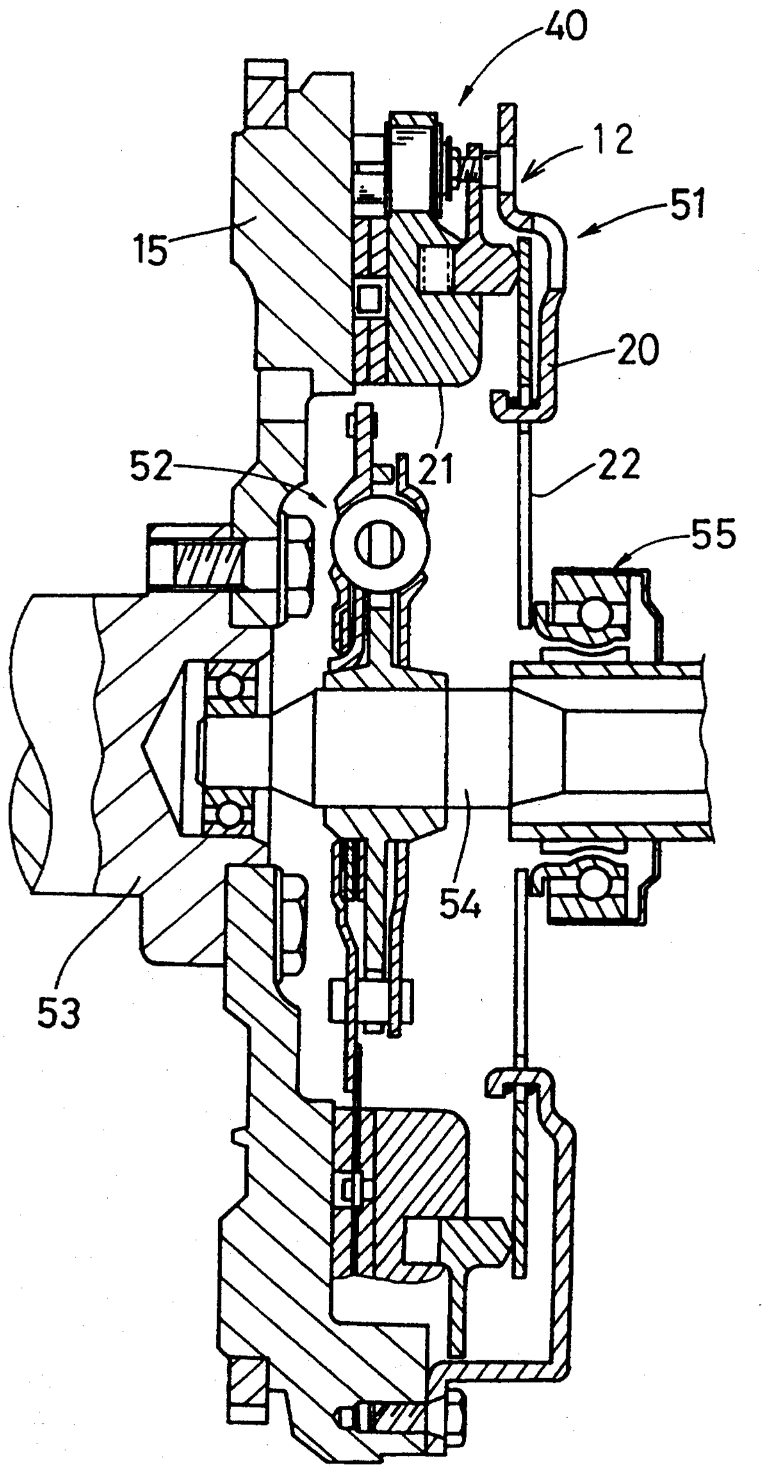
FIG. 1 is a schematic sectional view of a clutch to which the first embodiment of the present invention is applied.

FIG. 1 shows a clutch to which the first embodiment of the present invention is applied.

The clutch is principally composed of a clutch cover assembly 51 fixed to a flywheel and a clutch disc assembly 52. The flywheel 15 is fixed to a crankshaft 53 of the engine. A main drive shaft 54, extending from the transmission side (right in FIG. 1), is spline-engaged with the center of the clutch disc assembly 52. A release bearing 55 of the release assembly is located around the main drive shaft 54 so as to move in the axial direction.

Figure 2:
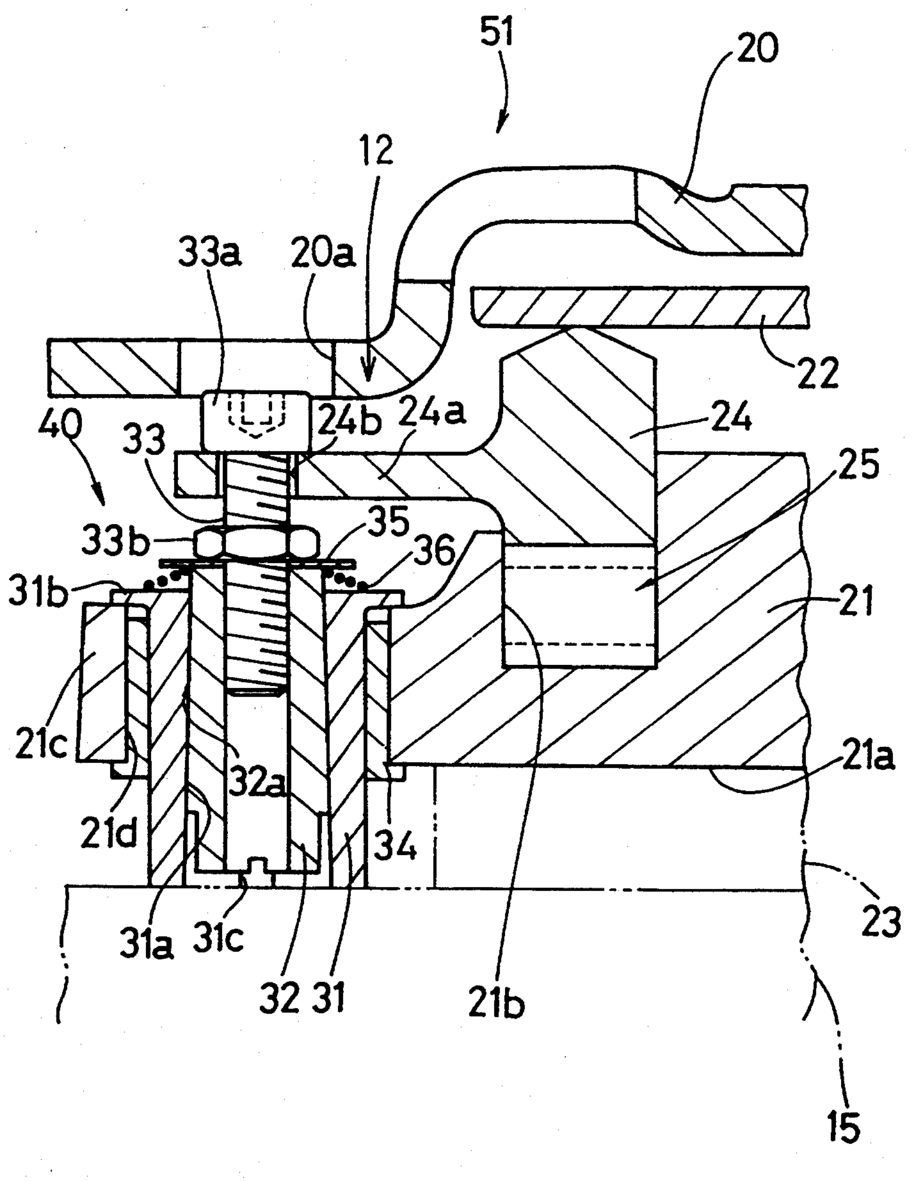
FIG. 2 a sectional partial view of a clutch cover assembly of the first embodiment of the present invention.

The clutch cover assembly 51 comprises, as detailed in FIG. 2, a clutch cover 20 fixed to the flywheel 15, a pressure plate 21 located in the clutch cover 20, a fulcrum ring 24 located on the clutch cover 20 side of the pressure plate 21, and a diaphragm spring 22 for pressing the pressure plate 21 toward the flywheel 15. The clutch cover assembly 51 further comprises a diaphragm spring posture maintenance mechanism 12.

The pressure plate 21 is a generally annular member and is connected to a clutch cover 20 through strap plates (not shown) such that the pressure plate 21 can move in the axial direction (the vertical direction in FIG. 2) relative to the clutch cover 20. The pressure plate 21 is formed with a pressing surface 21*a* toward the flywheel 15 in order to clamp facings 23 of the clutch disc assembly 52 between a friction surface of the flywheel 15 and the pressing surface 21*a*. The pressure plate 21 is also formed with an annular groove 21*b* on the diaphragm spring 22 side.

The diaphragm spring 22 is concentric with the clutch cover 20. Radially inward portion of the diaphragm spring 22 keeps in contact with the release bearing 55, and radially middle portion is supported by the clutch cover 20.

The diaphragm spring posture maintenance mechanism 12 comprises an adjustment mechanism 25 located in the groove 21*b* of the pressure plate 21, and a regulation mechanism 40 which regulates projecting amount of the fulcrum ring 24 toward the diaphragm spring 22 according to the wear amount of the facings 23.

The fulcrum ring 24 is pressed by radially outward portion of the diaphragm spring 22 toward the flywheel 15. The fulcrum ring 24 is provided with a flange 24*a* extending radially outward, the flange 24*a* having a plurality of axial holes 24*b*.

Figure 3:
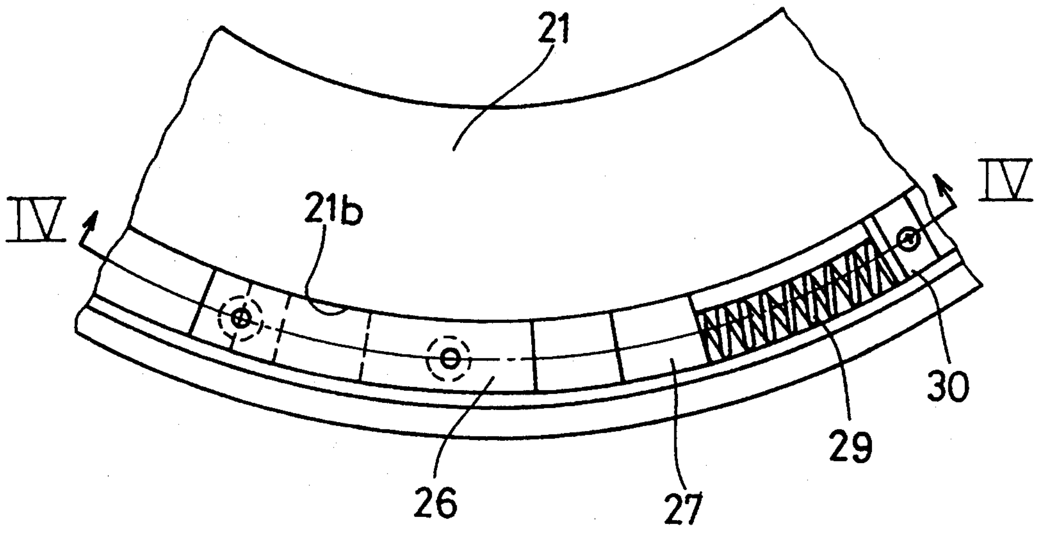
FIG. 3 is a transverse sectional view of an adjustment mechanism.
Figure 4:
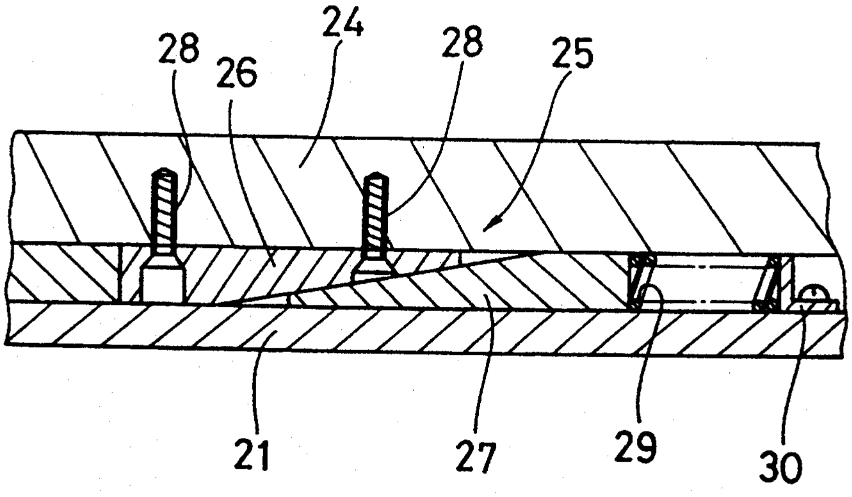
FIG. 4 is a sectional view cut through IV—IV in FIG. 3.

As shown in FIG. 3 and FIG. 4, the adjustment mechanism 25 comprises a first taper block 26 and a second taper block 27 in the grooves 21*b* wherein inclined surfaces of both keep in contact with each other. The first taper block 26 is fixed to the fulcrum ring 24 by two screws 28. The second taper block 27 is movable circumferentially in the groove 21*b*. Provided at one end of the second taper block in the groove 21*b* is a spring 29, which urges the second taper block 27 toward the first taper block 26. That is, the first taper block 26 is always given the force upward from the second taper block 27. The other end of the spring 29 is supported by a stop plate 30 fixed to the pressure plate 21.

Figure 5:
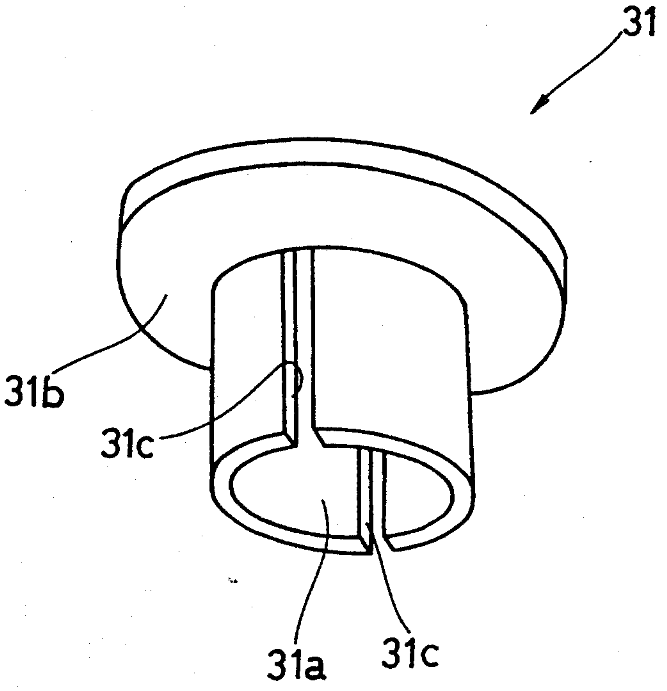
FIG. 5 is a perspective view of a wedge collar.

Referring to FIG. 2, the regulation mechanism 40 is disposed at a plurality of fix portions 21*c* integrally formed at the outer periphery of the pressure plate 21. Each of the fix portions 21*c* is formed with an axial hole 21*d*. The regulation mechanism 40 mainly comprises a wedge collar 31, a wedge 32 and a bolt 33. The wedge collar 31 is fitted into the hole 21*d* through a cylindrical liner 34, the wedge collar 31 being able to slide in the axial direction. The liner 34 has a flange keeping contact with the pressing surface 21*a* of the pressure plate 21 so as to move with the pressure plate 21 toward the flywheel 15. The wedge collar 31 is provided with a tapered inner surface 31*a* the diameter of which becomes shorter toward tile clutch cover 20 from the flywheel 15. The wedge collar 31 has a flange 31*b* keeping contact with the clutch cover 20 side of the pressure plate 21. As shown in FIG. 5, the cylindrical portion of the wedge collar 31 is formed with two slits 31*c* diametrically opposing to each other, whereby the wedge collar 31 can expand and contract in the radial direction. Wherein the facings 23 are clamped between the pressure plate 21 and the flywheel 15, one end of the wedge collar 31 is in contact with the flywheel 15. The wedge 32 is fitted into the wedge collar 31, wherein the wedge 32 is formed with an outer tapered surface 32*a* which is complementary to the inner surface 31*a* of the wedge collar 31. The wedge 32 is also formed with a screw hole into which the bolt 33 is screwed. One end of the wedge 32 is not in contact with the flywheel 15. A disc plate 35 is fixed at the other end of the wedge 32 by a nut 33*b* screwed at the middle of the bolt 33. Located between the plate 35 and the flange 31*b* of the wedge collar 31 is a conical coil spring 36, which urges the wedge 32 upward and the wedge collar 31 downward. That is, the wedge collar 31 and wedge 32 are locked to each other so that their relative movement is prohibited. The bolt 33 passes through the hole 24*b* of the flange 24*a* of the fulcrum ring 24, and its head portion 33*a* is located on the clutch cover 20 side of the flange 24*a* . The fulcrum ring 24 is prohibited Form moving axially outward (upward in FIG. 2) because the flange 24*a* is supported by the head portion 33*a*.

The liner 34 is provided for adjusting coefficient of friction between each members. Specifically, the liner 34 is made of materials with high friction coefficient so that frictional force between the wedge collar 31 and the pressure plate 21 through the liner 34 is higher than that between the wedge collar 31 and the wedge 32.

The clutch cover 20 is formed with a hole 20*a* which corresponds to the head portion 33*a* of the bolt 33.

Next, the operation of the clutch will be explained.

At the initial set operation shown in FIG. 2, the radially outward portion of the diaphragm spring 22 is in contact with the fulcrum ring 24. By release operation the radially outward portion of the diaphragm spring 22 is moved axially outward, and the pressure plate 21 moves upward in FIG. 2 by the strap plates (not shown). Therefore, the facings 23 are released from the pressure of the pressure plate 21.

Figure 6:
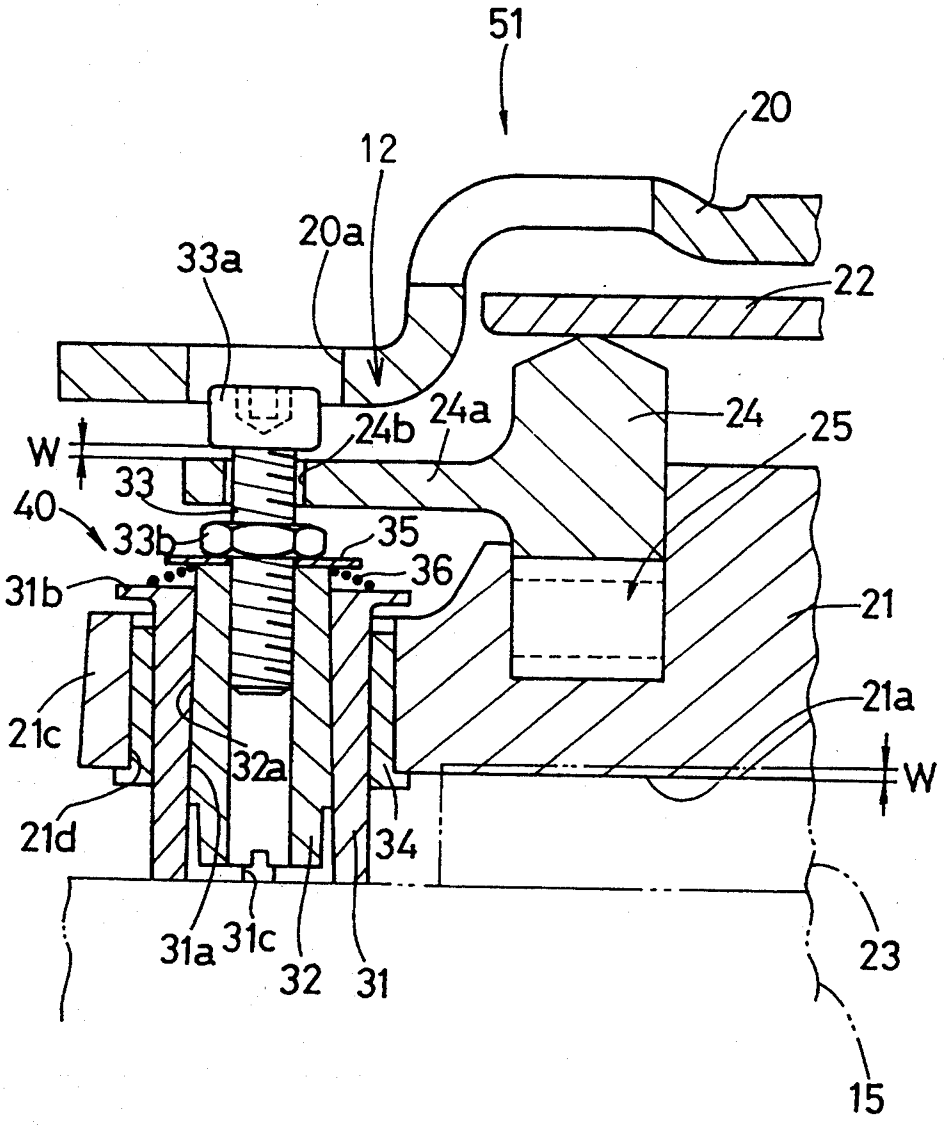
FIG. 6 is a view for explaining action of the first embodiment, corresponding to FIG. 2.

If the facings 23 are worn by wear W as shown in FIG. 6, the fulcrum ring 24 and the pressure plate 21 are moved toward the flywheel 15 by the pressure of the diaphragm spring 22. At this time, the wedge collar 31, the wedge 32 and the bolt 33 do not move relative to the flywheel 15 because one end of the wedge collar 31 is in contact with the flywheel 15. As a result, a space W corresponding to the wear W is kept between the flange 24*a* of the fulcrum ring 24 and the head portion 33*a* of the bolt 33.

Figure 7:
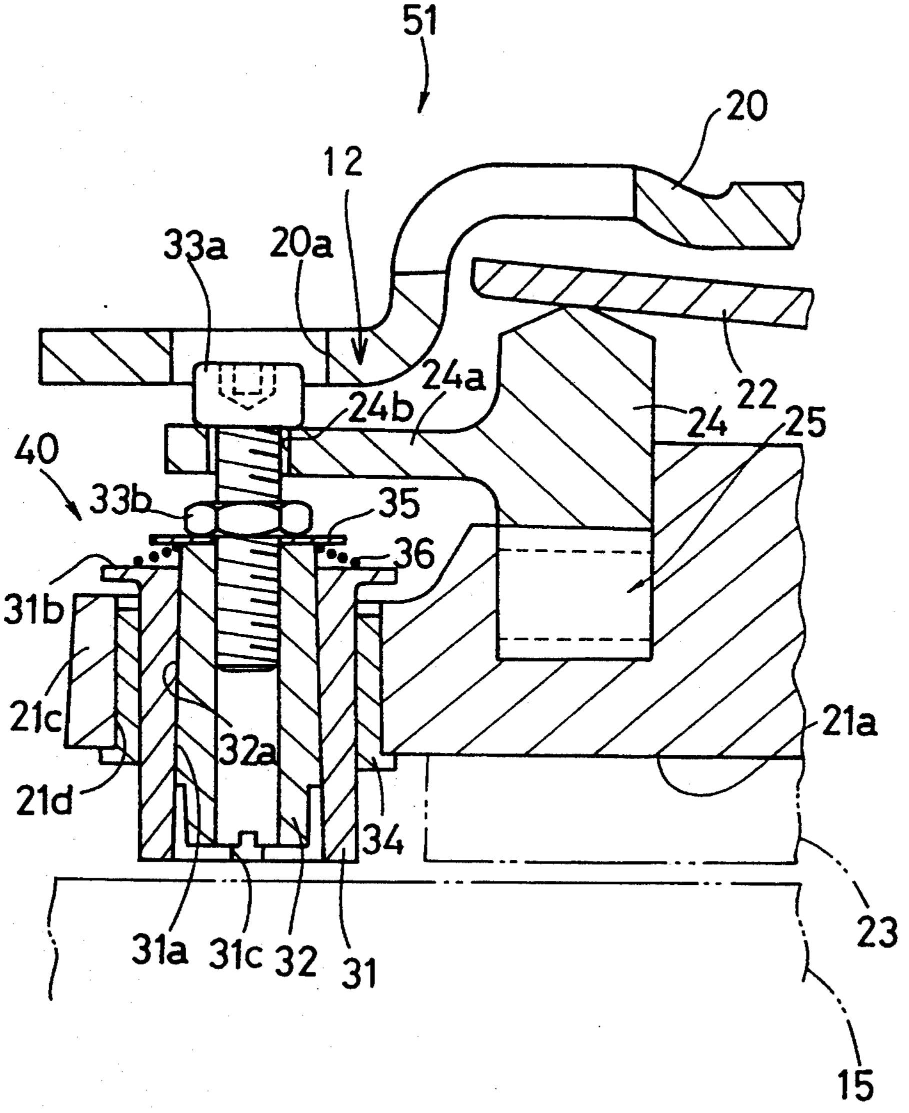
FIG. 7 is a view for explaining action of the first embodiment, corresponding to FIG. 2.

Then, at the release operation, the radially outward portion of the diaphragm spring 22 leaves the fulcrum ring 24 as shown in FIG. 7, the fulcrum ring 24, the pressure plate 21 and the regulation mechanism 40 move integrally toward the diaphragm spring 22. Since the release operation releases the pressure of the diaphragm spring 22 against the fulcrum ring 24, the second taper block 27 lifts up the first taper block 26 by resiliency of the spring 29 so that the fulcrum ring 24 projects axially outward. The flange 24*a* of the fulcrum ring 24 abuts against the head portion 33*a* of the bolt 33. Although the force to lift up the bolt 33 is applied to the wedge collar 31 through the wedge 32, the bolt 33 and the head portion 33*a* do not move relative to the pressure plate 21. The reason why the bolt 33 does not move is that when the wedge 32 is pulled by the wedge collar 31 in the axial direction the outer surface 32*a* pushes up the inner surface 31*a* and the wedge collar 31 is expanded radially outward so that the wedge collar 31 is pressed against the pressure plate 21 through the liner 34.

The condition by which beforementioned operation is guaranteed is that the liner 34 makes the frictional force between the wedge collar 31 and the wedge 32 greater than the that between the wedge collar 31 and the pressure plate 21. If the relation of the frictional forces is reverse, at the release operation after wear the wedge collar 31 is taken by the wedge 32 and moves relative to the pressure plate 21.

As explained before, the fulcrum ring 24 moves toward the diaphragm spring 22 by the wear amount W of the facings 23 and then is prevented from moving further by the regulation mechanism 40 which can not move axially outward relative to the pressure plate 21.

At the next set operation, the fulcrum ring 24 moves toward the flywheel 15 together with the pressure plate 21 and the regulating mechanism 40 by the pressure of the diaphragm spring 22. Since the flange 24*a* of the fulcrum ring 24 abuts against the bolt head portion 38*a* of the regulating mechanism 40, the fulcrum ring 24 has obtained the initial axial height. This means that the axial distance between the fulcrum ring 24 and the diaphragm spring 22 portion supported by the clutch cover 20 is maintained constant. Consequently, pressing posture of the diaphragm spring at the set operation does not change so that the initial set load can be maintained. Constant set load results in the following effects.

(a) It becomes possible to use the facings 28 until it reaches the wear limit, thereby lengthening the life of the clutch.

(b) It becomes possible to maintain torque transmission capability of the clutch in use because the set load is kept constant.

(c) It becomes possible to do release operation by the same release load because the release characteristics is the same.

Furthermore, since the regulating mechanism 25 consist of the wedge mechanisms which move circumferentially, the centrifugal force by engine rotation do not make the first taper block 26 go under the second taper block 27. Consequently, in this embodiment, it is possible to move the fulcrum ring 24 accurately according to the wear amount without being affected by the engine rotation speed, whereby the set load can be always maintained correctly.

The fix portion 21*c* of the pressure plate 21 may be constituted by a separate member which is fixed to the pressure plate 21 by bolts.

As a modification of this embodiment, the liner 34 can be omitted and the wedge collar 31 can be directly fitted into the hole 21*d* of the pressure plate 21. In this case, the outer surface 32*a* of the wedge 32 is processed by solid lubrication agent so that the frictional force between the wedge collar 31 and the wedge 32 becomes smaller than that between the wedge collar 31 and the pressure plate 21.

Second Embodiment

Figure 8:
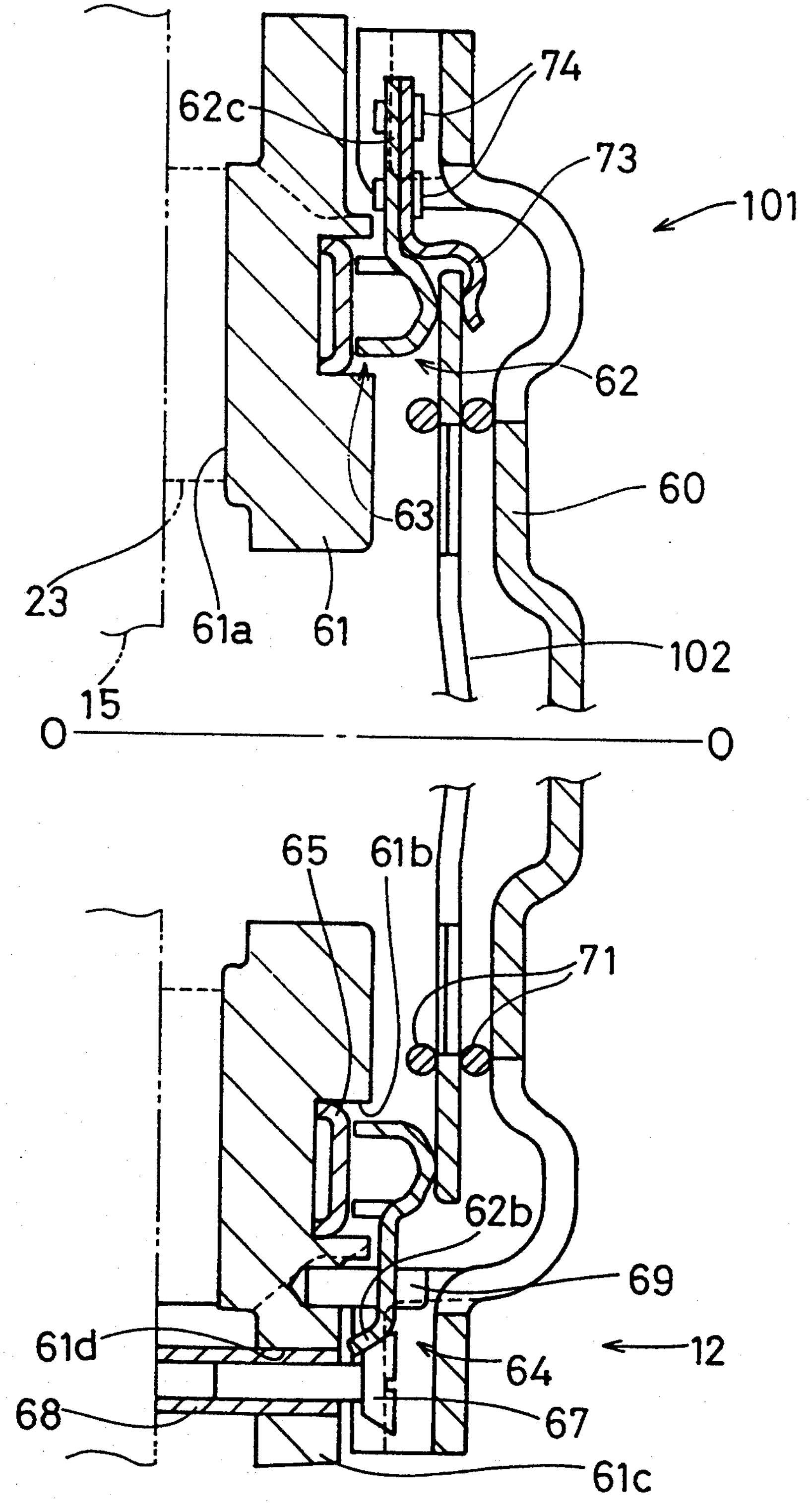
FIG. 8 is a schematic sectional partial view of a clutch cover assembly according to the second embodiment of the present invention.
Figure 9:
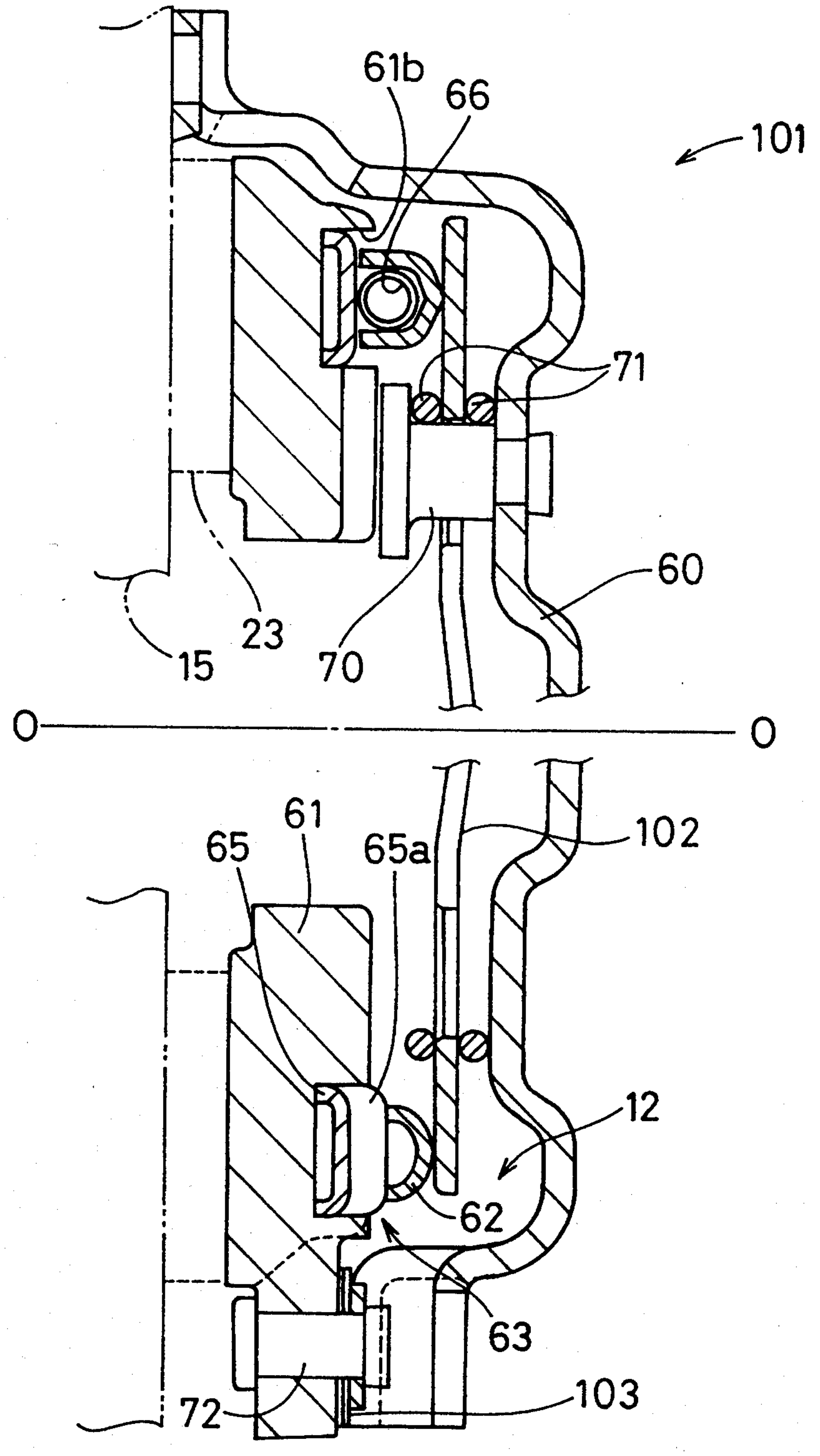
FIG. 9 is an another schematic sectional partial view of the clutch cover assembly according to the second embodiment of the present invention.

FIG. 8 and FIG. 9 show different sections of a clutch cover assembly 101 which is applied to a push type clutch as is the first embodiment. The clutch cover assembly 101 principally comprises a clutch cover 60 fixed to a flywheel 15, a pressure plate 61 is located in the clutch cover 60, a diaphragm spring 102 for pressing the pressure plate 61 toward the flywheel 15, a fulcrum ring 62 disposed between the diaphragm spring 102 and the pressure plate 61, and a diaphragm spring posture maintenance mechanism 12.

The pressure plate 61 is generally annular and is provided with a pressing surface 61*a* for clamping facings 23 of the clutch cover assembly between the flywheel 15 and itself. The pressure plate 61 is also provided with an annular groove 61b on the diaphragm spring 102 side. Integrally formed at outer periphery of the pressure plate 61 are a plurality of fixation portions 61c, each fix portion 61c having an axial hole 61d. One ends of strap plates 103 are fixed to the outer periphery of the pressure plate 61 by rivets 72 and the other ends are fixed to the clutch cover 60. Accordingly, the pressure plate 61 is fixed to the clutch cover 60 such that pressure plate 61 can move in the axial direction. Radially inward end of the diaphragm spring 102 is in contact with a release bearing (not shown), and radially middle portion of the diaphragm spring 102 is supported by the clutch cover 60 through support members 70 fixed to the clutch cover 60 and to wire rings 71.

The diaphragm spring posture maintenance mechanism 12 comprises an adjustment mechanism 63 disposed in the groove 61b of the pressure plate 61, and a regulation mechanism 64 located at the fix portion 61c of the pressure plate 61.

Figure 10:
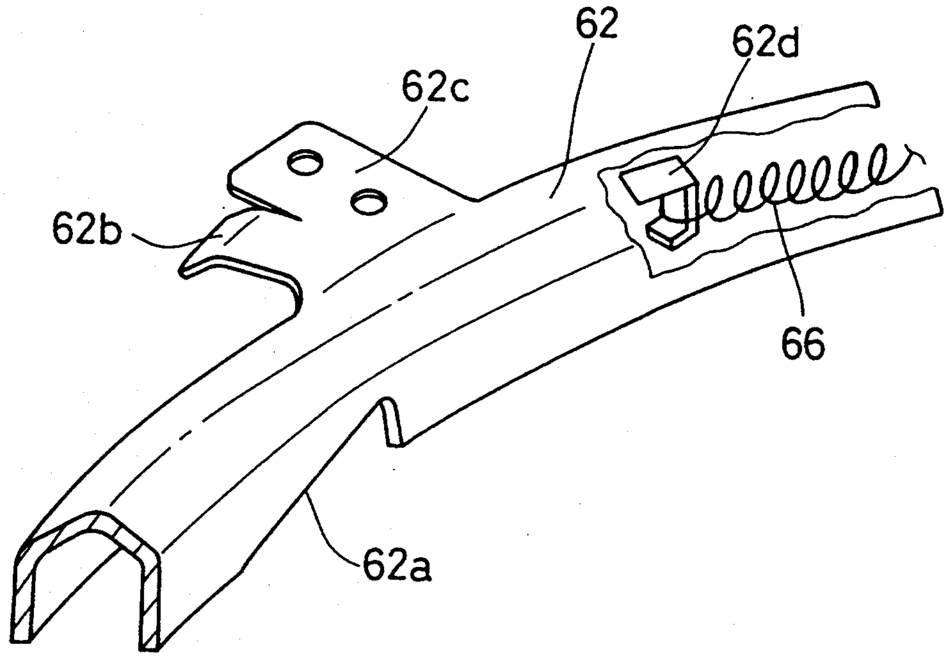
FIG. 10 is a partial perspective view of a fulcrum ring.
Figure 11:
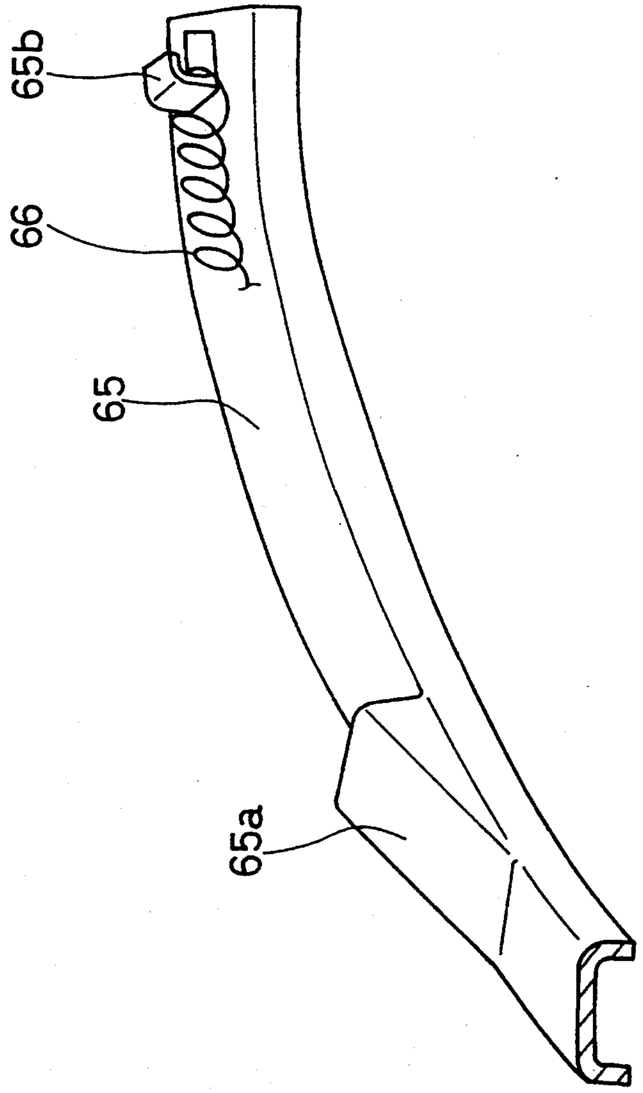
FIG. 11 is a partial perspective view of a tapered block.

Referring to FIG. 10 and FIG. 11, the adjustment mechanism 63 is for urging the fulcrum ring 62 to move toward the diaphragm spring 102. A taper block 65 which mainly constitute the adjustment mechanism 63 is located in the groove 61b of the pressure plate 61. The taper block 65 has, as shown in FIG. 11, a plurality of inclined portions 65a which project upward. The fulcrum ring 62 is located on the taper block 65 in the groove 61b. The fulcrum ring 62 is, as shown in FIG. 10, open downward and its upper portion is shaped like a ridge so as to abut against the pressing portion of the diaphragm spring 102. The fulcrum ring 62 is narrower than the taper block 65 in width. The fulcrum ring 62 is formed with inclined portions which has the same angle with the inclined portion 65a of the taper block 65 and corresponds to the inclined portions 65a . The taper block 65 is urged toward the fulcrum ring 62 in one direction by springs 66 between plates 62d and 65b fixed to each other. The taper block 65 is urged against the fulcrum ring 62 such that the fulcrum ring 62 moves toward the diaphragm spring 102 by the wedge mechanisms of the inclined portion 62a and 65a.

As shown in FIG. 10, the fulcrum ring 62 has sets of the a push-up portion 62b and an engagement portion 62c which are cut and raised at the outer periphery. The push-up portion 62b has a radially outward end inclined downward at a certain angle. As shown in FIG. 8, fixed to the engagement portion 62c through rivets 74 is a spring member 73, which presses the pressing portion of the diaphragm spring 102 from the clutch cover 60 side.

The regulation mechanism 64 is, as shown in FIG. 8, located at the fix portions 61c of the pressure plate 61. The regulation mechanism 64 is mainly composed of a bolt 67 and a collar 68. The bolt 67 is fitted into the hole 61d through the collar 68. The bolt 67 is a flash bolt the head of which is flat countersunk such that the head has conical surface keeping in contact with the push-up portion 62b of the fulcrum ring 62. The fulcrum ring 62 is urged by the wedge mechanisms composed of inclined portion 62a and 65a toward the clutch cover 60, but the fulcrum ring 62 is prevented from moving axially by the regulation mechanism 64 at the release operation. The reason is that the push-up portion 62b urges the head portion of the bolt 67 in the angled direction so that the collar 68 is tilted to generate the frictional force against the hole 61d surface. One end of the collar 68 is in contact with the flywheel 15 when the facings 23 are clamped between the pressure plate 61 and the flywheel 15 as shown in the figures.

A plurality of pins 69 are fixed to the pressure plate 61 radially outward of the fulcrum ring 62 and beside the push-up portions 62b, in order to determine the position of the fulcrum ring 62.

Next, the operation will be explained.

At the initial set operation, as shown in FIG. 8 and FIG. 9 the ridge of the fulcrum ring 62 is in contact with the radially outward portion of the diaphragm spring 102. When the facings 23 are worn, the fulcrum ring 62 and the pressure plate 61 move toward the flywheel 15 by the pressure of the diaphragm spring 102. At this time, the bolt 67 and the collar 68 of the regulation mechanism 64 do not move relative to the flywheel 15 because one end of the collar 68 is in contact with the flywheel 15. As a result, a space corresponding to the wear amount of the facings 23 is generated between the push-up portion 62b of the fulcrum ring 62 and the head portion of the bolt 67.

Then, at the next release operation, the pressing portion of the diaphragm spring 102 moves rightward in the figures such that the fulcrum ring 62, the pressure plate 61 and the regulation mechanism 64 moves toward the diaphragm spring 102. Simultaneously, the inclined portion 65a of the taper block 65 pushes up the inclined portion 62a of the fulcrum ring 62 because by the release operation the diaphragm spring 102 is no longer pressing the fulcrum ring 62. The fulcrum ring 62 moves by the wear amount rightward in the figures until the push-up portion 62b of the fulcrum ring 62 abuts against the head portions of the bolt 67. The push-up portion 62b tilts the bolt 67 so that the collar 68 is tilted after the collar 68 is urged against the hole 61d of the fix portion 61c for frictional engagement. Consequently, the head of the bolt 67 does not move relative to the pressure plate 61.

As explained before, since the regulation mechanism prevents the pressure plate 61 from moving axially outward (rightward In the figures), the fulcrum ring 62 is prevented moving axially. Accordingly, the fulcrum ring 62 projects toward the diaphragm spring 102 by the wear amount of the facings 23 and then stops.

At the next set operation, the fulcrum ring 62 moves toward the flywheel 15 together with the pressure plate 61 and the regulation mechanism 64. Since the push-up portion 62b of the fulcrum ring 62 abuts against the head portion of the bolt 67, the fulcrum ring 62 has the initial axial height. Accordingly, the axial space between the fulcrum ring 62 ridge and diaphragm spring 102 portion supported by the clutch cover 60 is maintained constant. That is, pressing posture of the diaphragm spring 102 at the set operation does not change and the initial set load can be kept. The effect obtained by this function are the same with the effects (a)-(c) of the first embodiment.

In this embodiment, since the fulcrum ring 62 is moved by the wedge mechanisms functioning in the circumferential direction, the fulcrum ring 62 is not affected by the engine rotation speed. Consequently, the fulcrum ring 62 can be moved accurately according to the wear amount and the initial set load can be always maintained correctly.

Third Embodiment

Figure 12:
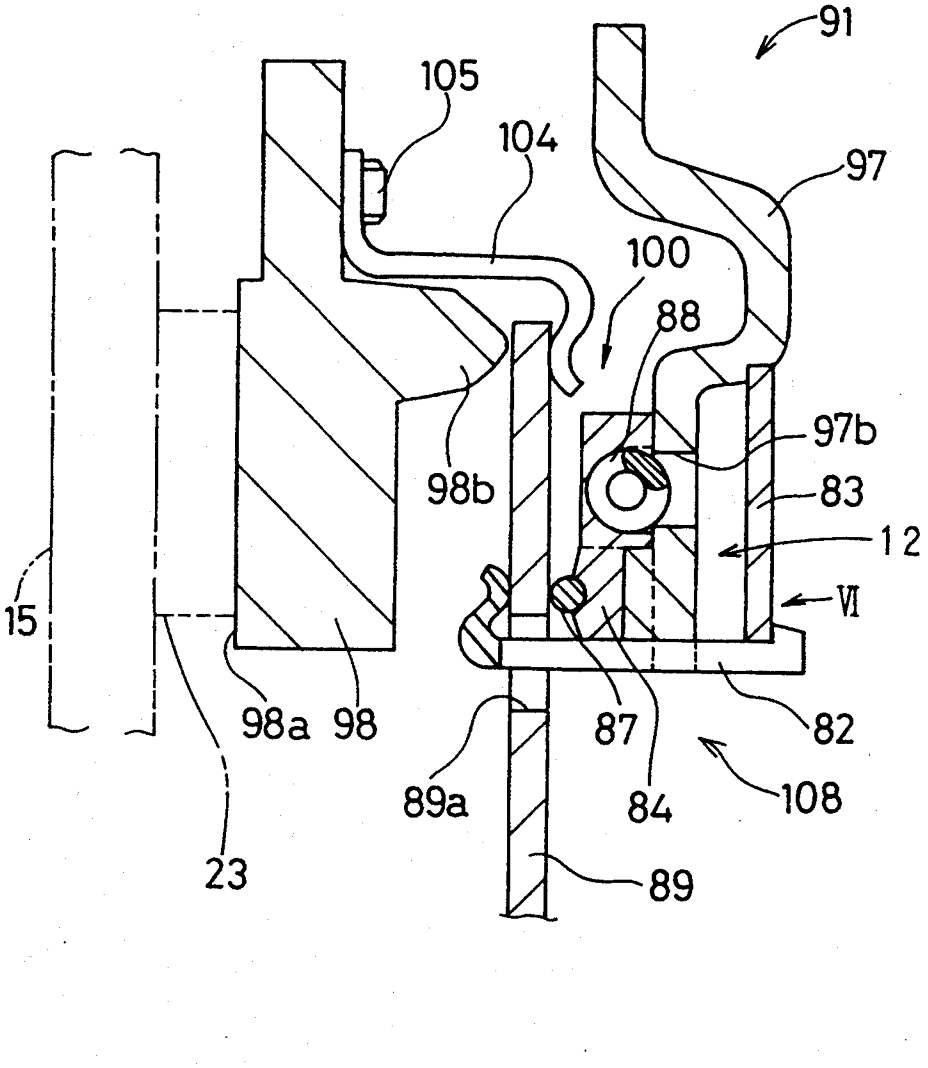
FIG. 12 is a sectional partial view of a clutch cover assembly according to the third embodiment of the present invention.

A clutch cover assembly 91 shown in FIG. 12 is employed in a push-type clutch like the first and the second embodiments, and comprises a clutch cover 97 fixed to the flywheel 15, a pressure plate located in the clutch cover 97, a diaphragm spring 89 for pressing the pressure plate 98 toward the flywheel is, and a diaphragm spring posture maintenance mechanism 12 for maintaining pressing posture of the diaphragm spring 89.

The pressure plate 98 is generally annular and is provided with a pressing surface 98*a* for clamping facings 23 of the clutch disc assembly between the flywheel 15 and itself. The pressure plate 98 is formed with an annular projection 98*b* projecting in the axial direction on the diaphragm spring 98 side. The pressure plate 98 is fixed to clutch cover 97 through strap plates (not shown) so as to be movable in the axial direction.

Radially inward end of the diaphragm spring 89 is in contact with the release bearing (not shown), and its radially middle portion is supported by a lever plate 82 (later described) of a regulation mechanism 108. The diaphragm spring 89 has a radially outward end for pressing the projection 98*b* of the pressure plate 98, the radially outward end being held between a spring member 104 fixed to the pressure plate 98 by a bolt 105 and the ridge of the projection 98*b*.

The diaphragm spring posture maintenance mechanism 12 includes an adjustment mechanism 100 and a regulating mechanism 108.

Figure 16:
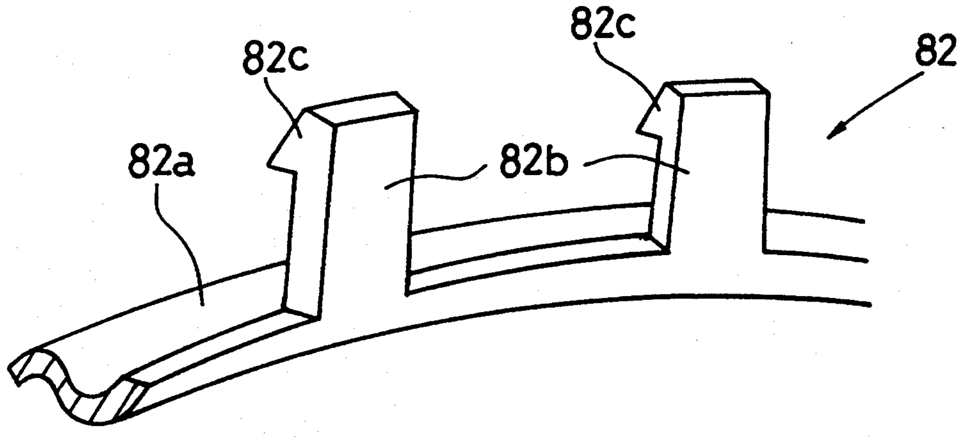
FIG. 16 is a partial perspective view of a lever plate.
Figure 17:
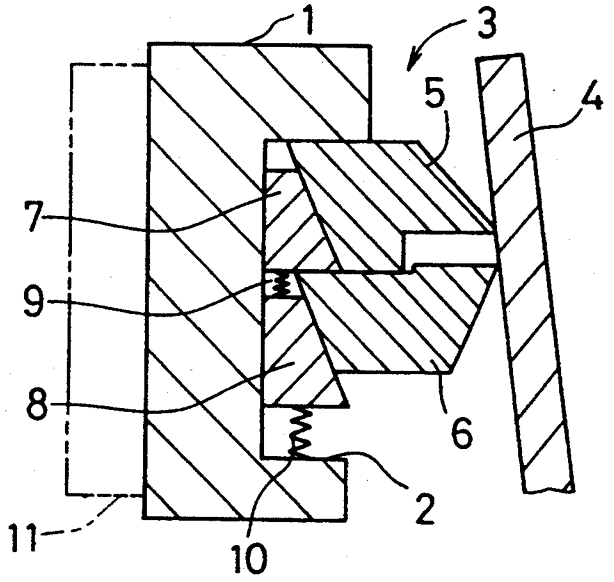
FIG. 17 is a view of a prior art, corresponding to FIG. 2.

The regulating mechanism is principally composed of a lever plate 82 and a cone spring 83. The lever plate 82 is, as shown in FIG. 16, composed of a ring 82*a* which abuts against the flywheel 15 side to support the diaphragm spring 89 radially middle portion, and plurality of projecting portions 82*b* extending axially from the inner side of the ring 82*a*. Each of the projecting portions 82*b* passes through a hole 89*a* in the diaphragm spring 89 and is supported in a cutout 97*c* (FIG. 13) made at radially inner end of the clutch cover 97 so as to be movable in the axial direction. The projecting portion 82*b* has an engagement portion 82*c* at the axial outer end. The cone spring 83 has an outer end supported by clutch cover 97 and an inner end supported by the engagement portions 82*c* of the lever plate 82 and urges the lever plate 82 axially outward. Urging force of the cone spring 83 is set larger that the initial release load of the diaphragm spring 89 (force by which the diaphragm spring 89 urges the lever plate 82 toward the flywheel 15 at the release operation).

Figure 13:
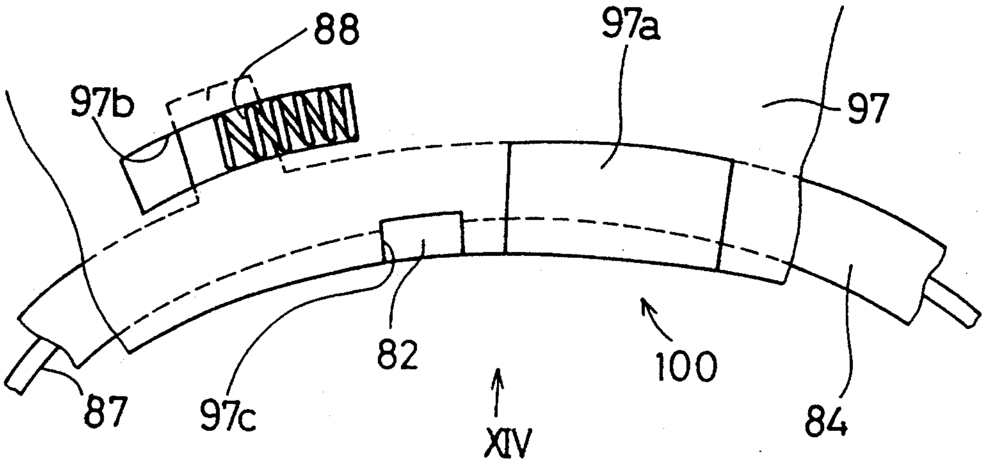
FIG. 13 is a top view of the adjustment mechanism according the third embodiment.
Figure 14:
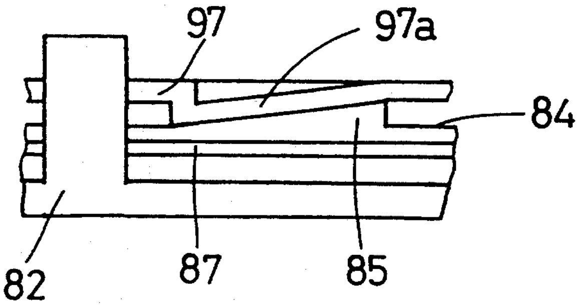
FIG. 14 is a view seen from X IV direction in FIG. 13.
Figure 15:
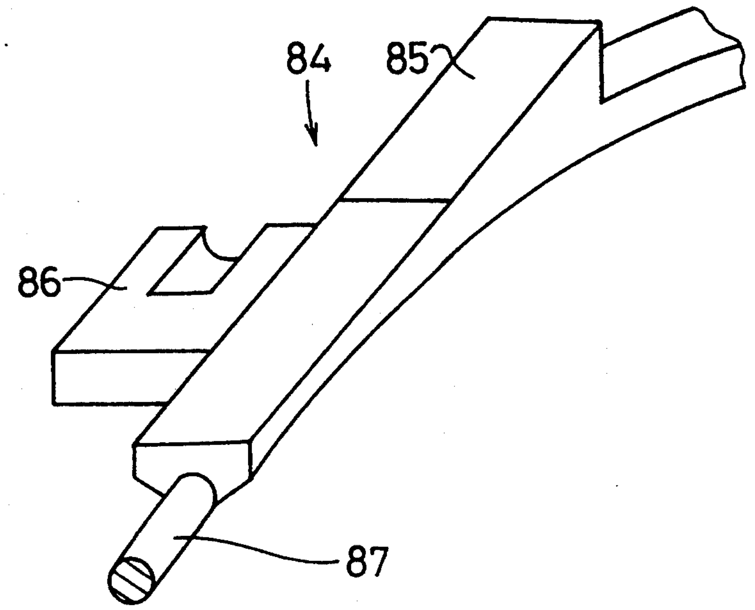
FIG. 15 a partial perspective view of a ring member.

The adjustment mechanism 100 includes a ring member 84, a coil spring 88 and a wire ring 87. The ring member 84 is disposed radially outward of the lever plate 82 and between the diaphragm spring 89 and the clutch cover 97. The ring member 84 is shown in FIG. 13 to FIG. 15 and diaphragm spring 89 side thereof is in contact with the diaphragm spring 89 radially middle portion through the wiring 87. As shown in FIG. 15, the ring member 84 is formed with a plurality of inclined portions 85 extending in the circumferential direction. The ring member 84 is also formed with a portion 86 for receiving spring at the outer periphery. The inclined portions 85 of the ring member 84 is in contact with a plurality of inclined portions 97*a* formed in the clutch cover 97. The coil springs 88 has one end in contact with the spring receiving portions 86 and the other end abutting against holes 97*b* extending in the circumferential direction in the clutch cover 97. In this state, the coil spring 88 are compressed so that they urge the ring members 84 relative to the clutch cover 97 in one direction (leftward In FIG. 13 and FIG. 14). The ring member 84 is always urged toward the flywheel 14 by the wedge mechanisms composed of the inclined portions 85 of the ring member 84 and the inclined portions 97*a* of the clutch cover 97.

Next, the operation will be explained.

If facings 23 are worn during the set operation, the diaphragm spring 89 pressing portion moves toward the flywheel 15 with the pressure plate 98. As a result, pressing posture of the diaphragm spring 89 changes to a rising one.

At the next release operation, the release load of the diaphragm spring 89 has become larger because its posture change so that the release load is over the urging force of the cone spring 83 so as to move the lever plate 82 toward the flywheel 15 to a point where loads are balanced. A space between the wire ring 87 and the radially middle portion of the diaphragm spring 89 is made. The ring member 84 moves toward the flywheel 15 to fill the space and abut against the diaphragm spring 89 radially middle portion. Since the radially middle portion on the clutch cover 97 side of the diaphragm spring 89 is supported by the ring member 84, at the next set operation pressing posture of the diaphragm spring 89 is the same with initial posture so that the initial set load can be maintained.

As explained before, if the facings 23 is worn at the set operation, the diaphragm spring 89 radially middle portion is moved toward the flywheel 14 according to the wear amount and maintained there during the next release operation so that the axial distance between the projection 98*b* of the pressure plate 98 and the diaphragm spring 89 radially middle portion which is supported by the clutch cover 97. That is, the pressing posture of the diaphragm spring 89 is the same and the initial set load of the diaphragm spring 89 is always maintained. Effects obtained by this operation is the same with the effects (a)–(c) described in the first embodiment.

Furthermore, in this embodiment, even if the engine rotation speed becomes higher, the ring member 84 does not press the diaphragm spring 89 radially middle portion more that its urging force because the movement of the ring member 84 is driven by the wedge mechanisms functioning In the circumferential direction. Accordingly, the pressing posture of the diaphragm spring 89 is can be accurately maintained so that the initial set load of the diaphragm spring 89 can be correctly maintained.

Various details of the invention may be changed without departing from its spirit nor scope. Furthermore, the foregoing description according to the present invention is provided for the purpose of illustration only, and not for the purpose of limiting the invention as defined by the appended claims and their equivalents.

What is claimed is:

1. A clutch cover assembly functioning to clamp friction facings of a clutch disc between a component of the assembly and an input plate member, comprising:
   - a dish-shaped clutch cover connected to said input plate member;
   - an annular pressure plate provided with a pressure-facing surface, disposed within a clutch cover, having a component for pressing said friction facings against said input plate member;
   - a projection provided on an end surface of said pressure plate reverse of said pressure-facing surface, said projection having a radially outward extending portion formed with an axial aperture;
   - a diaphragm spring having a fulcrum portion supported by said clutch cover and a portion impelling said projection in order to press said pressure plate toward said input plate member;

a diaphragm spring posture maintenance mechanism for maintaining constant axial separation between a surface of said projection directed toward said clutch cover, and said diaphragm spring fulcrum portion; said diaphragm spring posture maintenance mechanism including an adjustment mechanism for urging said projection toward said diaphragm spring fulcrum portion and composed of a wedge mechanism having a circumferentially extending inclined surfaces superficially in contact with each other, and an urging member for urging one of said inclined surfaces circumferentially against the other thereby shifting either of said inclined surfaces axially;

a regulation mechanism coupled to said pressure plate, supported in an axial hole on a radially outward extension formed peripherally on said pressure plate, said regulation mechanism having a contact end and a limiter end, said contact end being engageable with said input plate member during the clutch engagement operation, and said limiter end engageable with a portion of said projection, said regulation mechanism being pushed toward said diaphragm spring relative to said pressure plate through contact with said input plate member by a distance generally equal to the amount of wear of said clutch disc friction facings allowing said projection to move axially according to said wear of said clutch disc friction facings, said regulation mechanism being unable to move relative to said pressure plate when said regulation mechanism is urged toward said diaphragm spring by said protection movement and able to move relative to said pressure plate when said regulation mechanism is pushed toward said diaphragm spring through contact with said input plate member; said regulation mechanism further comprising:

a first cylindrical member forming said contact end, having an outer surface fitted into said axial hole and a bore tapered toward said diaphragm spring, said first cylindrical member being formed with a slit whereby said first cylindrical member is expandable and contractible radially; and a stop member including a head portion located against a surface of said radially outward extending portion opposite said diaphragm spring and larger than said axial aperture, a taper portion located within said first cylindrical member having an outer surface complementary to and in contact with the tapered bore of said first cylindrical member, and a connection portion passing through said axial aperture to connect said head portion and said taper portion, wherein when said radially outward extending portion of said projection urges said head portion toward said diaphragm spring, said taper portion expands said first cylindrical member radially outward such that said first cylindrical member is wedged in said axial hole.

2. A clutch cover assembly according to claim 1, wherein said head portion and said connection portion compose a bolt, and said taper portion is a second cylindrical member into which said bolt is screwed.

3. A clutch cover assembly according to claim 2, wherein said regulation mechanism further includes an urging member for urging said first cylindrical member and said second cylindrical member mutually such that said second cylindrical member expands said first cylindrical member, wherein movement of said first and second cylindrical members relative to each other is prohibited.

4. A clutch cover assembly according to claim 3, wherein said pressure plate is formed with an annular groove opposite said pressure-facing surface, said adjustment mechanism being located within said annular groove.

5. A clutch cover assembly according to claim 4, wherein said wedge mechanism is composed of a first wedge member having a first inclined surface and located within said annular groove so as to be circumferentially movable, and a second wedge member having a second inclined surface being complementary to and in contact with said first inclined surface and fixed to said projection.

6. A clutch cover assembly according to claim 1, wherein said regulation mechanism further includes a third cylindrical member disposed between said first cylindrical member and said axial hole in said radially outward extension, making frictional force between said first cylindrical member and said axial hole along its bore greater than that between said first cylindrical member and said taper portion of said stop member.

7. A clutch cover assembly according to claim 1, wherein a solid lubrication agent is added to said outer surface of said taper portion such that the frictional force between said first cylindrical member and said taper portion of said stop member is less that between said first cylindrical member and the bore of said axial hole.

8. A clutch cover assembly according to claim 1, wherein said pressure plate is formed with an annular groove opposite said pressure-facing surface, said adjustment mechanism being located within said annular groove.

9. A clutch cover assembly according to claim 8, wherein said wedge mechanism is composed of a first wedge member having a first inclined surface and located within said annular groove so as to be circumferentially movable, and a second wedge member having a second inclined surface being complementary to and in contact with said first inclined surface and fixed to said projection.

10. A clutch cover assembly according to claim 1, wherein said pressure plate is formed with an annular groove opposite said pressure-facing surface, said adjustment mechanism being located within said annular groove.

11. A clutch cover assembly according to claim 10, wherein said wedge mechanism is composed of a first wedge member having a first inclined surface and located within said annular groove so as to be circumferentially movable, and a second wedge member which has a second inclined surface being complementary to and in contact with said first inclined surface and fixed to said projection.

12. A clutch cover assembly according to claim 10, wherein said wedge mechanism is composed with a wedge member having an inclined surface and located within said groove so as to be circumferentially movable, and an inclined surface formed on said projection which is complementary to and in contact with said inclined surface of said wedge member.

13. A clutch cover assembly functioning to clamp friction facings of a clutch disc between a component of the assembly and an input plate member, comprising:

a dish-shaped clutch cover connected to said input plate member;

an annular pressure plate provided with a pressure-facing surface, disposed within a clutch cover, having a component for pressing said friction facings against said input plate member;

a projection provided on an end surface of said pressure plate reverse of said pressure-facing surface and coupled to said pressure plate for limited displacement therewith;

a diaphragm spring having a fulcrum portion supported by said clutch cover and a portion impelling said projection in order to press said pressure plate toward said input plate member;

a diaphragm spring posture maintenance mechanism for maintaining constant axial separation between a surface of said projection directed toward said clutch cover, and said diaphragm spring fulcrum portion; said diaphragm spring posture maintenance mechanism including an adjustment mechanism composed of a wedge mechanism having a circumferentially extending inclined surfaces superficially in contact with each other, and an urging member for urging one of said inclined surfaces circumferentially against the other thereby shifting either of said inclined surfaces axially;

a regulation mechanism coupled to said pressure plate, supported in an axial hole on a radially outward extension formed peripherally on said pressure plate, said regulation mechanism having a contact end and a limiter end, said contact end being engageable with said input plate member during the clutch engagement operation, and said limiter end engageable with a portion of said projection, said regulation mechanism being pushed toward said diaphragm spring relative to said pressure plate through contact with said input plate member by a distance generally equal to the amount of wear of said clutch disc friction facings allowing said projection to move axially according to said wear of said clutch disc friction facings.

14. A clutch cover assembly according to claim 13, wherein said regulation mechanism is unable to move relative to said pressure plate when said regulation mechanism is urged toward said diaphragm spring by said projection movement, and able to move relative to said pressure plate when said regulation mechanism is pushed toward said diaphragm spring through contact with said input plate member.

* * * * *